(12) United States Patent
Chester et al.

(10) Patent No.: US 11,668,441 B2
(45) Date of Patent: Jun. 6, 2023

(54) ZAYNE LIGHT

(71) Applicants: Alana Marija Chester, Sherman Oaks, CA (US); Ana Maria Chester, Warren, OH (US)

(72) Inventors: Alana Marija Chester, Sherman Oaks, CA (US); Ana Maria Chester, Warren, OH (US)

( * ) Notice: Subject to any disclaimer, the term of this patent is extended or adjusted under 35 U.S.C. 154(b) by 0 days.

(21) Appl. No.: 17/947,021

(22) Filed: Sep. 16, 2022

(65) Prior Publication Data
US 2023/0097545 A1   Mar. 30, 2023

Related U.S. Application Data

(60) Provisional application No. 63/245,407, filed on Sep. 17, 2021.

(51) Int. Cl.
| *F21L 4/00* | (2006.01) |
| *F21L 4/08* | (2006.01) |
| *F21L 4/04* | (2006.01) |
| *G06K 19/06* | (2006.01) |
| *F21W 131/40* | (2006.01) |
| *F21Y 101/00* | (2016.01) |

(52) U.S. Cl.
CPC ................ *F21L 4/08* (2013.01); *F21L 4/04* (2013.01); *G06K 19/06009* (2013.01); *F21W 2131/40* (2013.01); *F21Y 2101/00* (2013.01)

(58) Field of Classification Search
CPC ... F21L 4/00; F21L 4/005; F21L 4/022; F21L 4/027; F21L 4/08; F21L 4/085; F21V 23/0414; F21V 15/01; F21V 15/02; G06K 19/06009; F21W 2131/40
See application file for complete search history.

(56) References Cited

U.S. PATENT DOCUMENTS

| 4,222,111 A | 9/1980 | Sloan |
| 4,329,740 A * | 5/1982 | Colvin ............... F21S 9/02 362/184 |
| 5,272,474 A | 12/1993 | Hilliard |
| 6,980,088 B2 | 12/2005 | Stambaugh |
| 10,395,186 B1 | 8/2019 | McCullough |
| 10,839,685 B2 | 11/2020 | Stefik |

(Continued)

OTHER PUBLICATIONS

Lightspeed, Retrieved from Internet, Retrieved on Jun. 11, 2021 <URL: https://resto-support.lightspeedhq.com/hc/en-us/articles/360005901634>.

*Primary Examiner* — Y M. Quach Lee

(57) ABSTRACT

A cube for use in a restaurant allowing patrons to more easily notify their server they are in need of something. The cube is equipped with a lighting mechanism that adjusts colors that represent the status of the patrons dining. The cube contains a shell that has an upper surface and lower surface separated by an indent. The cube has a pair of switches that reside within a divot slightly larger in size that the switch. The charging station for the cube has a dock, a layer, and a power supply. The dock has a base equipped with a plurality of dock base towers, each having a plurality of dock tower connections. The dock base has a plurality of base supports each having a central plug. The layer also has layer connection towers each equipped with layer tower connections allowing the layer to function in tandem with the dock base.

15 Claims, 17 Drawing Sheets

(56) References Cited

U.S. PATENT DOCUMENTS

2006/0279415 A1* 12/2006 Solheim ................ G08B 7/068
340/286.09
2017/0082250 A1* 3/2017 Heilbrun .................. F21L 4/08
2017/0132991 A1* 5/2017 Hwang ............ G06K 19/06009

* cited by examiner

ZAYNE LIGHT

FIELD OF THE INVENTION

The present invention relates generally to restaurant appliances, more specifically to a device capable of alerting restaurant staff, providing a QR code, and timing customer visits. The present invention is a rectangular prism with equal width and depth and a height about three times the width or depth.

BACKGROUND OF THE INVENTION

Restaurant owners and management need to pay attention to several patrons throughout the establishment. If the restaurant is busy, it can be difficult to provide adequate service to every table of customers. Customers may try to wave down their waiter or waitress but could be unintentionally left waiting due to the frantic nature of a busy restaurant. Additionally, patrons may want to spend more leisure time than is ideal for the restaurant. The restaurant may have a long waitlist and benefit from patrons leaving shortly after finishing a meal. Patrons staying longer than ideal can lead to other customers getting frustrated with wait time as a result.

It is an objective of the present invention to overcome the aforementioned problems with a device capable of signaling restaurant staff when customers require assistance. The device is also capable of keeping track of the amount of time customers spend at each table. To signal restaurant staff, a switch sitting atop the device can be pressed to activate a lighting mechanism within the device. The lighting mechanism illuminates the device, and the respective waiter or waitress can become aware that the customers at the table require assistance. There is also a timing device that begins when customers are seated. The timer changes the color of the light depending on how much time has passed since the customers first sat down. These two services make managing customers much easier for restaurant staff.

SUMMARY OF THE INVENTION

The present invention is a rectangular prism with an ability to illuminate via an internal lighting mechanism. The present invention has a switch on front and rear surfaces of the invention that customers can press to manually activate the lighting mechanism and summon restaurant staff. The present invention achieves the objectives mentioned above by displaying time spent at a table to patrons and providing a way to summon a waiter or waitress without having to speak up.

DETAIL DESCRIPTIONS OF THE INVENTION

All illustrations of the drawings are for the purpose of describing selected versions of the present invention and are not intended to limit the scope of the present invention.

In reference to FIG. 1 through 17, the present invention is a Zayne light. The present invention attempts to provide a restaurant with easier management of customers and decreased wait times for customers. The present invention attempts this with the various components involved that enable customers to activate a light, or that inform customers of limited time left at a particular table.

Figure 1:
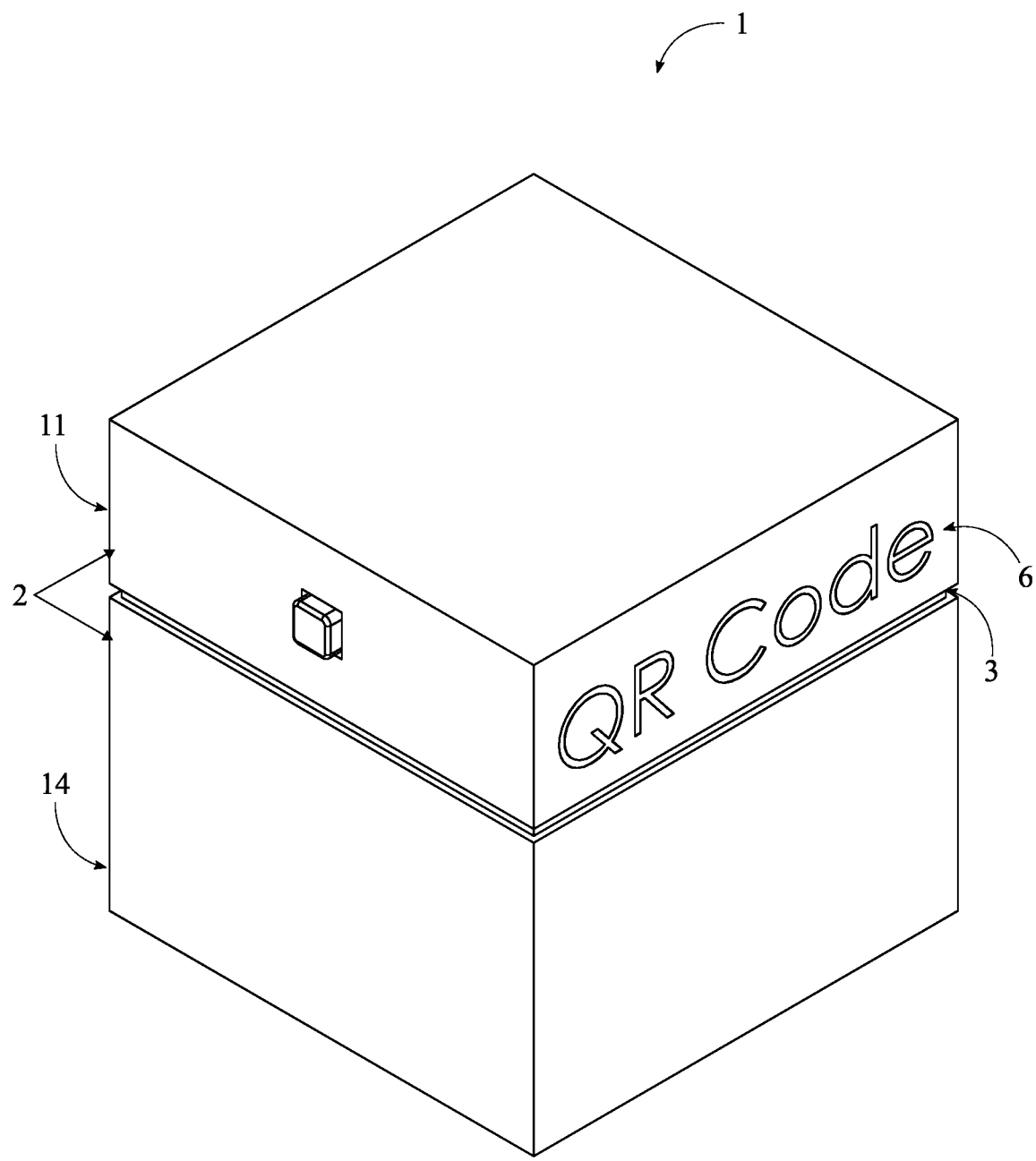
FIG. 1 is a top-front-left perspective view of the cube component of the present invention.
Figure 2:
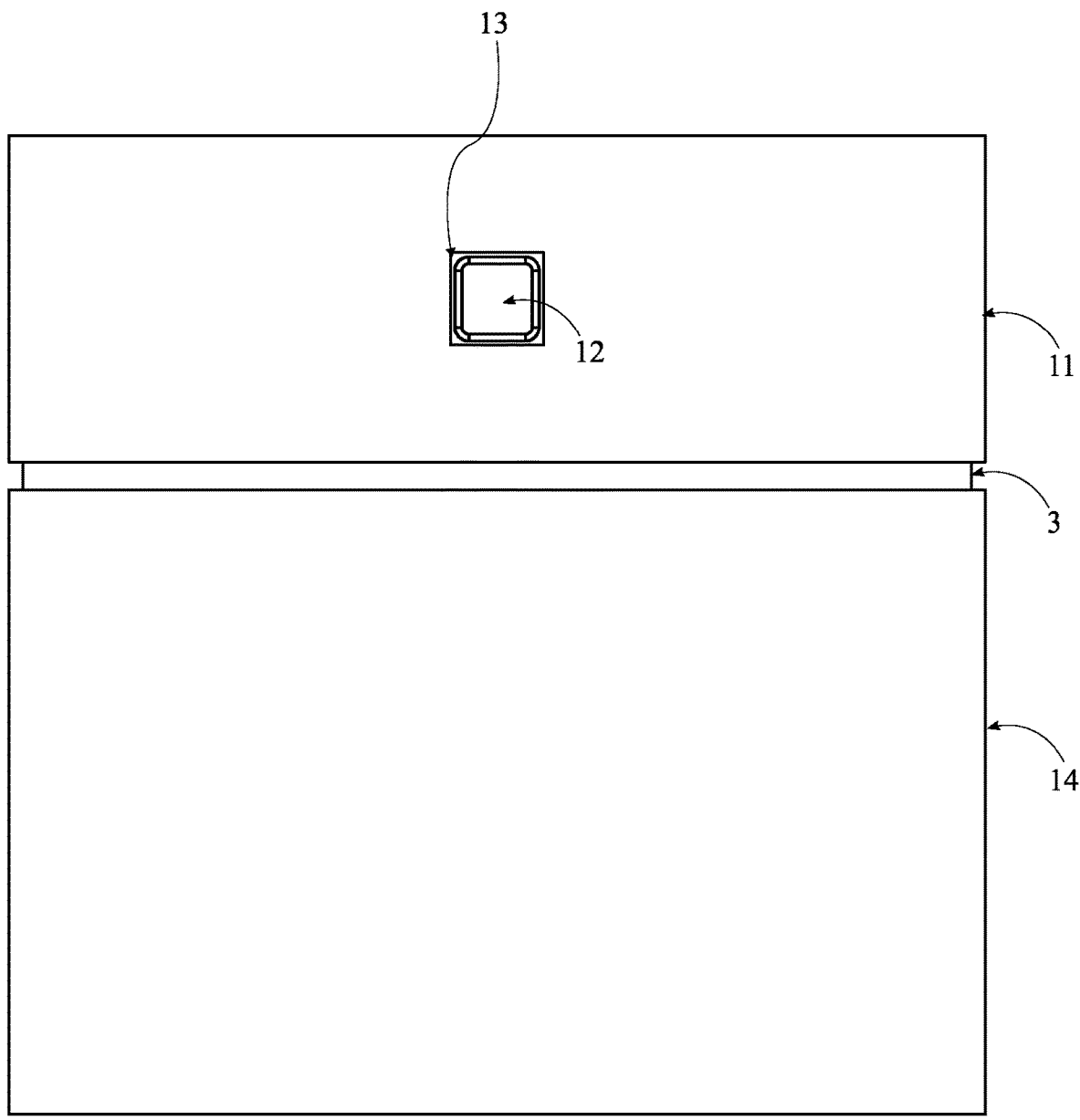
FIG. 2 is a front view of the cube component of the present invention.
Figure 3:
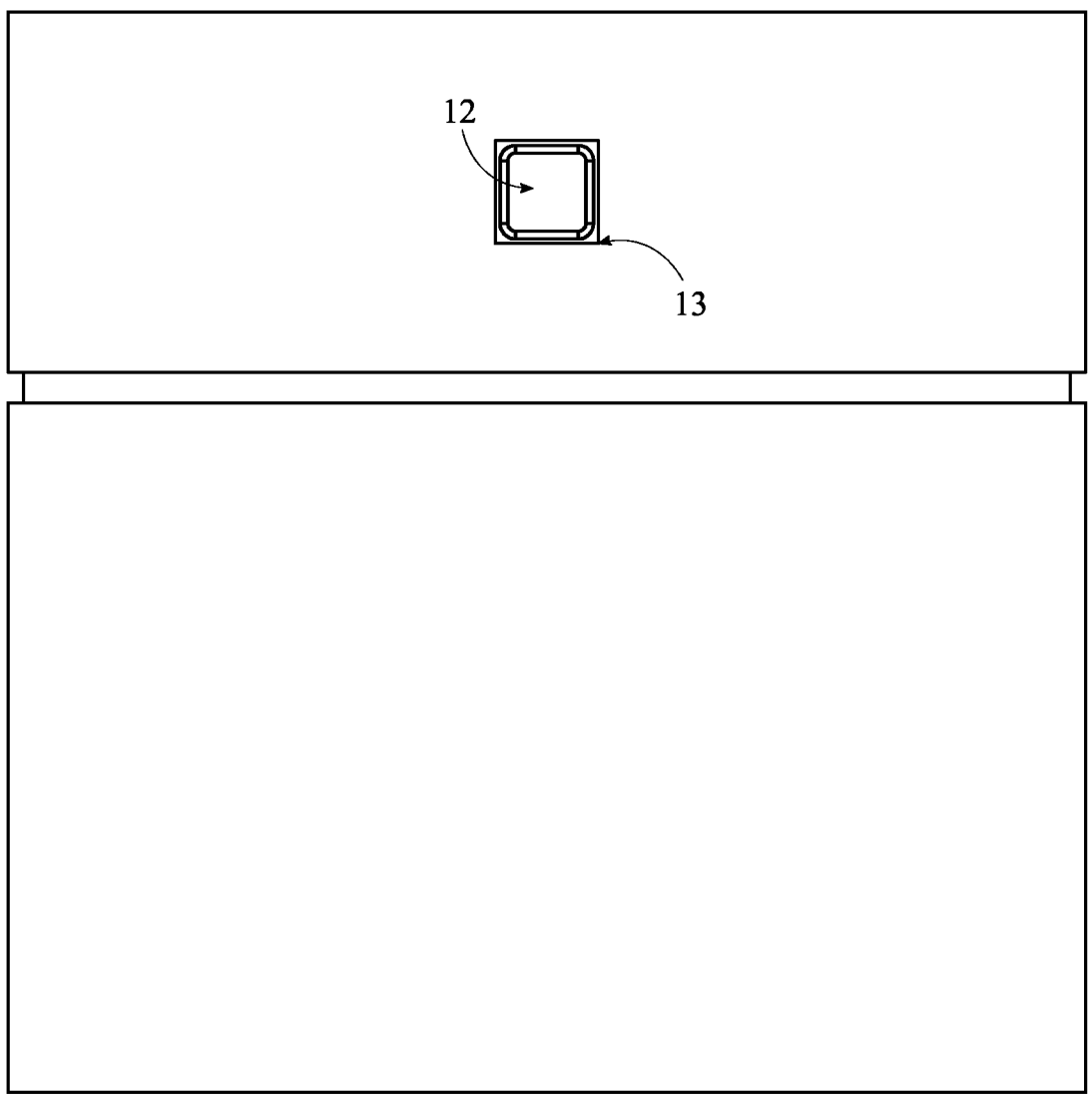
FIG. 3 is a rear view of the cube component of the present invention.
Figure 4:
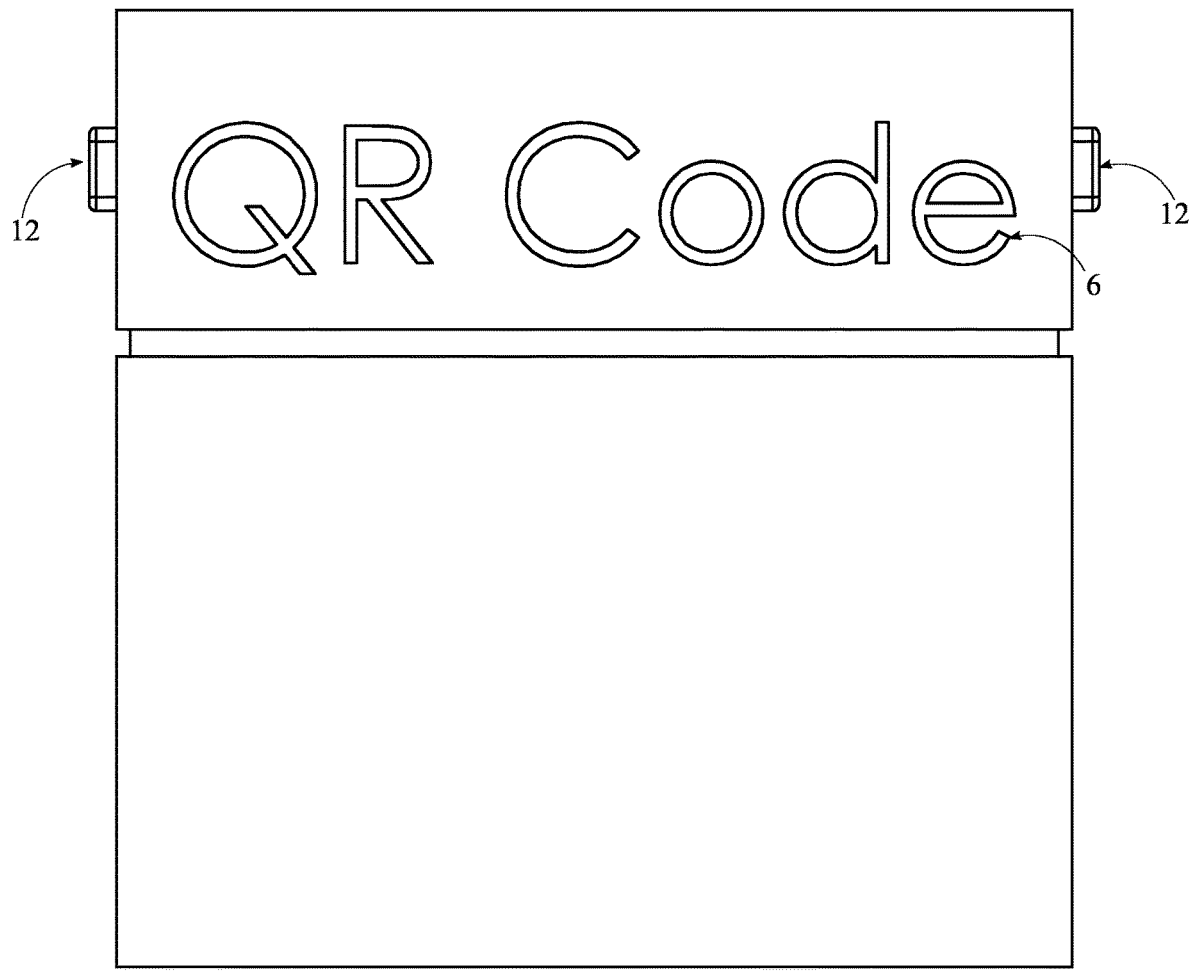
FIG. 4 is a left view of the cube component of the present invention.
Figure 5:
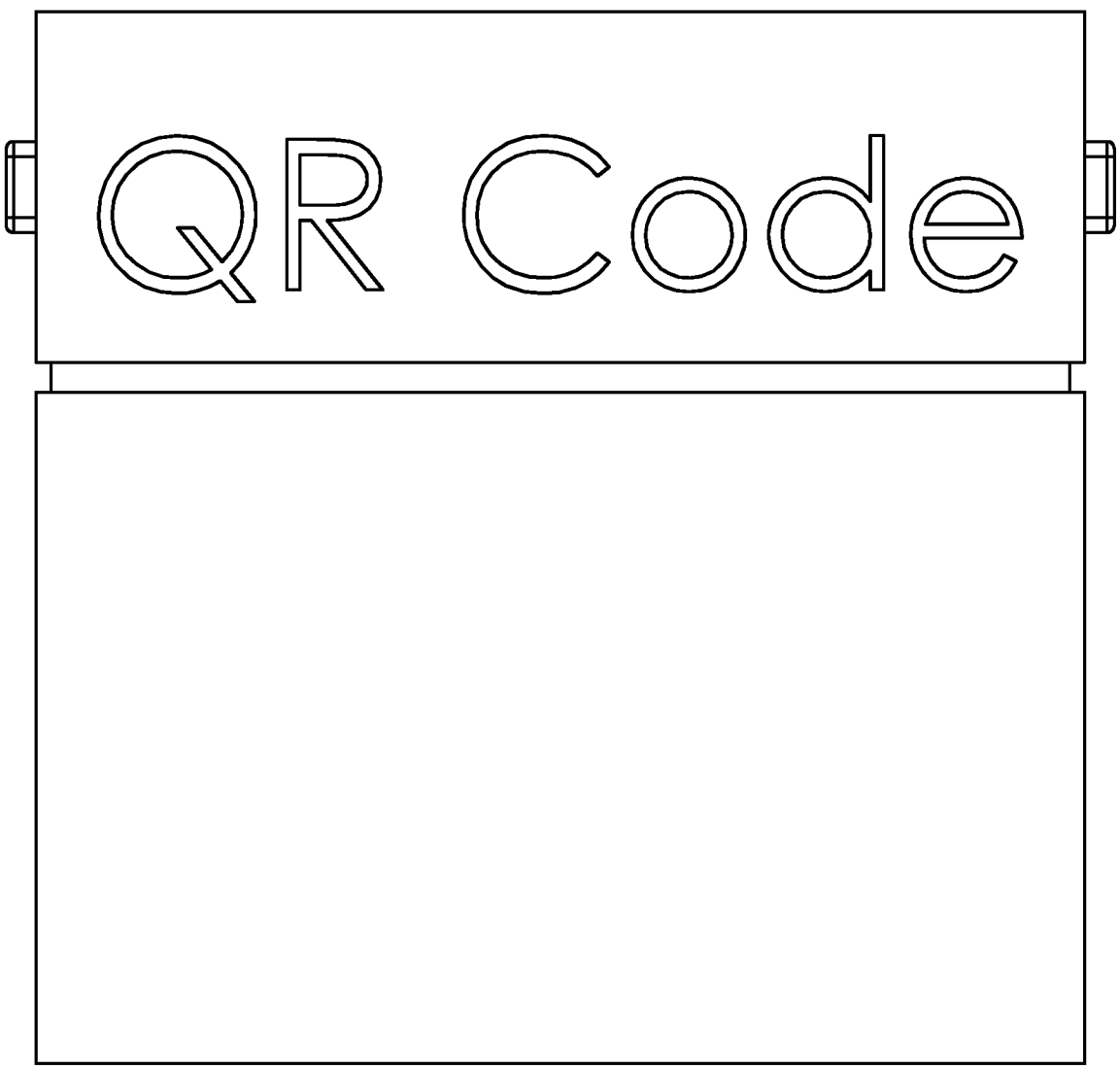
FIG. 5 is a right view of the cube component of the present invention.
Figure 6:
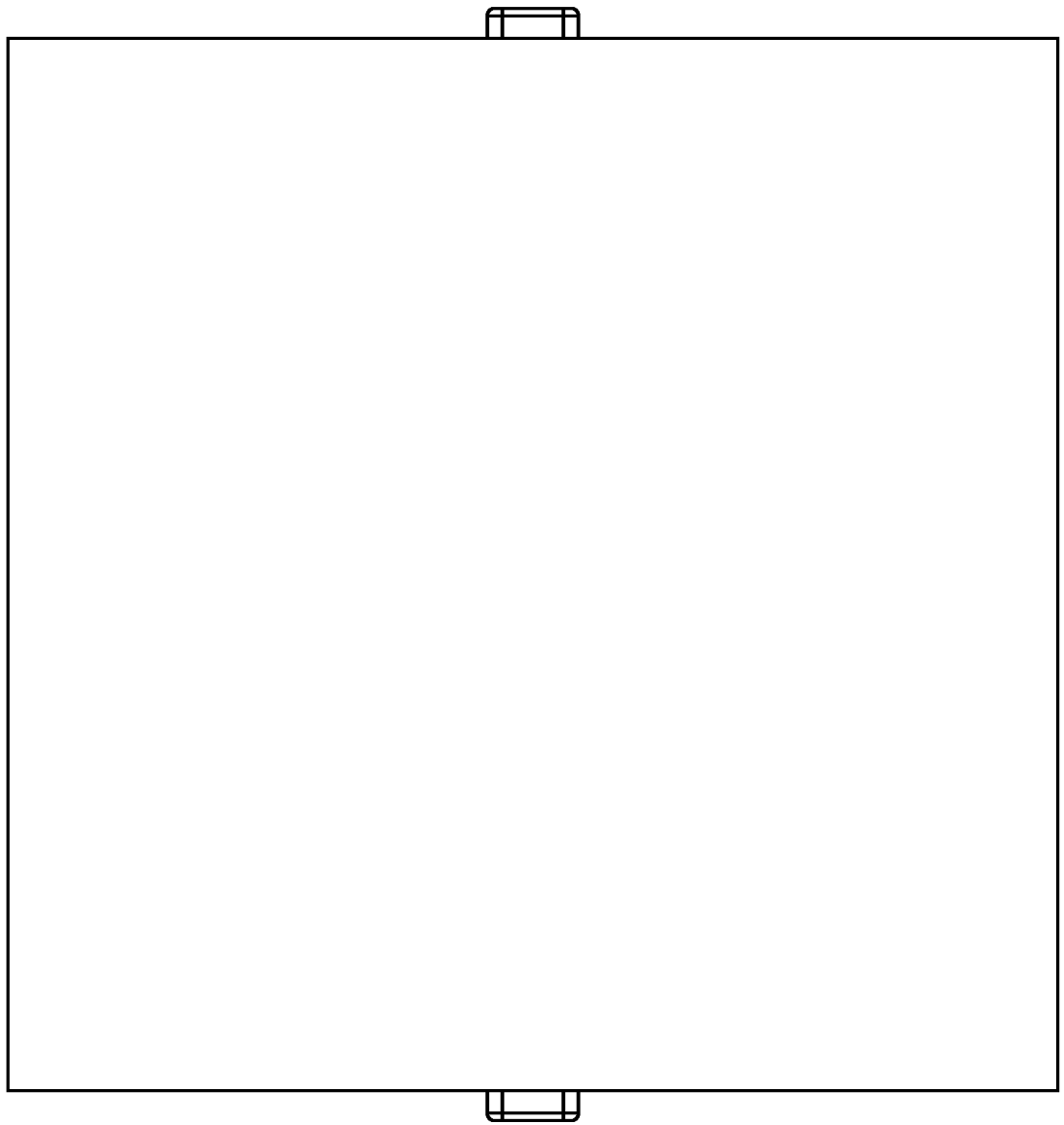
FIG. 6 is a top view of the cube component of the present invention.
Figure 7:
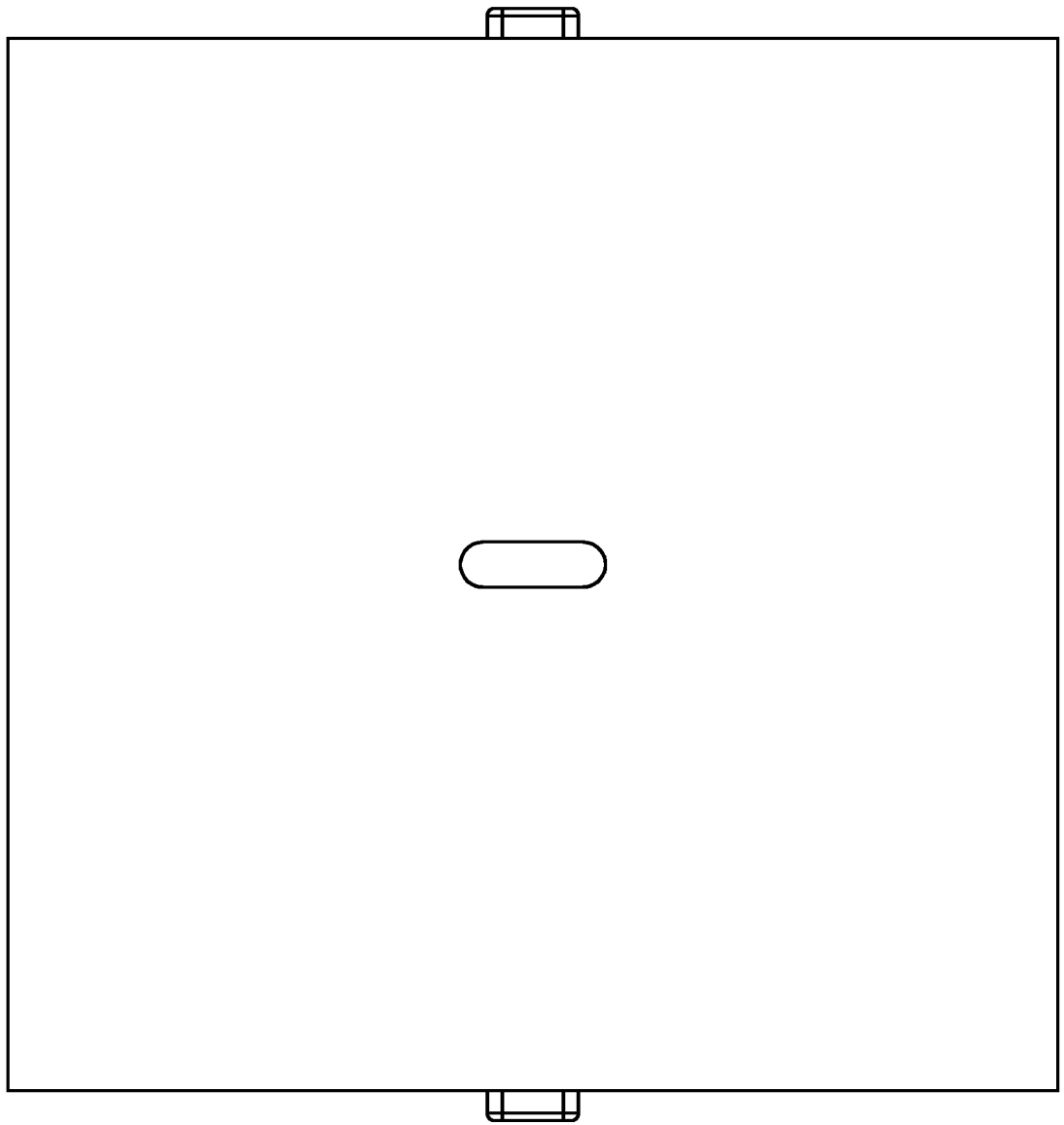
FIG. 7 is a bottom view of the cube component of the present invention.

In a preferred embodiment, the Zayne light 1 comprises a shell 2. The shell 2 is the complete external surface of the Zayne light 1. The shell 2 is a cube in shape with equal height, width, and depth. The shell 2 includes a plurality of sides. The left and right sides of the shell 2 are identical and can be seen in FIG. 4 and FIG. 5. The front and rear sides of the shell 2 are also identical and are shown in FIG. 2 and FIG. 3. On each side, a third of the surface is separated from the rest of the surface a third of the way down from the top of each side with an indent 3. The indent 3 is in the same location on each side and stretches horizontally across the entire width of each side, thus connecting to each indent 3 on each adjacent side. The surface above the indent 3 is preferably the upper surface 11, and the surface below the indent 3 is the lower surface 14. The upper surface 11 has a height equal to a third of the total height of the shell 2, while the lower surface 14 has a height equal to two thirds the total height of the shell 2. The lower surface 14 of each side is bare, but the upper surfaces of the left side of the shell 2 and the right side of the shell 2 ideally hold a quick response (QR) code 6 printed onto the shell 2, as shown in FIG. 4 and FIG. 5. The QR code 6 interacts with the camera on a cellular device to open the restaurant website or menu on the customer's cellular device. In other embodiments, other types of machine-readable codes can be provided on different surfaces throughout the device.

Another component involved in the Zayne light 1 is a pair of switches 12. The pair of switches 12 include a small rectangular prism located on the front surface and the rear surface of the shell 2 shown in FIG. 2 and FIG. 3. Each switch is recessed into each respective surface of the shell 2 due to a divot. The divot 13 is a square shaped hole in the center of the top surface that allows for the switch 12 to be pressed into the shell 2. The divot 13 is only slightly larger than the switch, permitting the switch to move into and out of the shell 2 freely. A lighting mechanism is an additional component of the Zayne light 1. The lighting mechanism resides preferably in the bottom of the shell 2 of the Zayne light cube 1 and illuminates the entire Zayne light cube 1. The switch is capable of interacting with the lighting mechanism so that the user can selectively activate the lighting mechanism.

Figure 8:
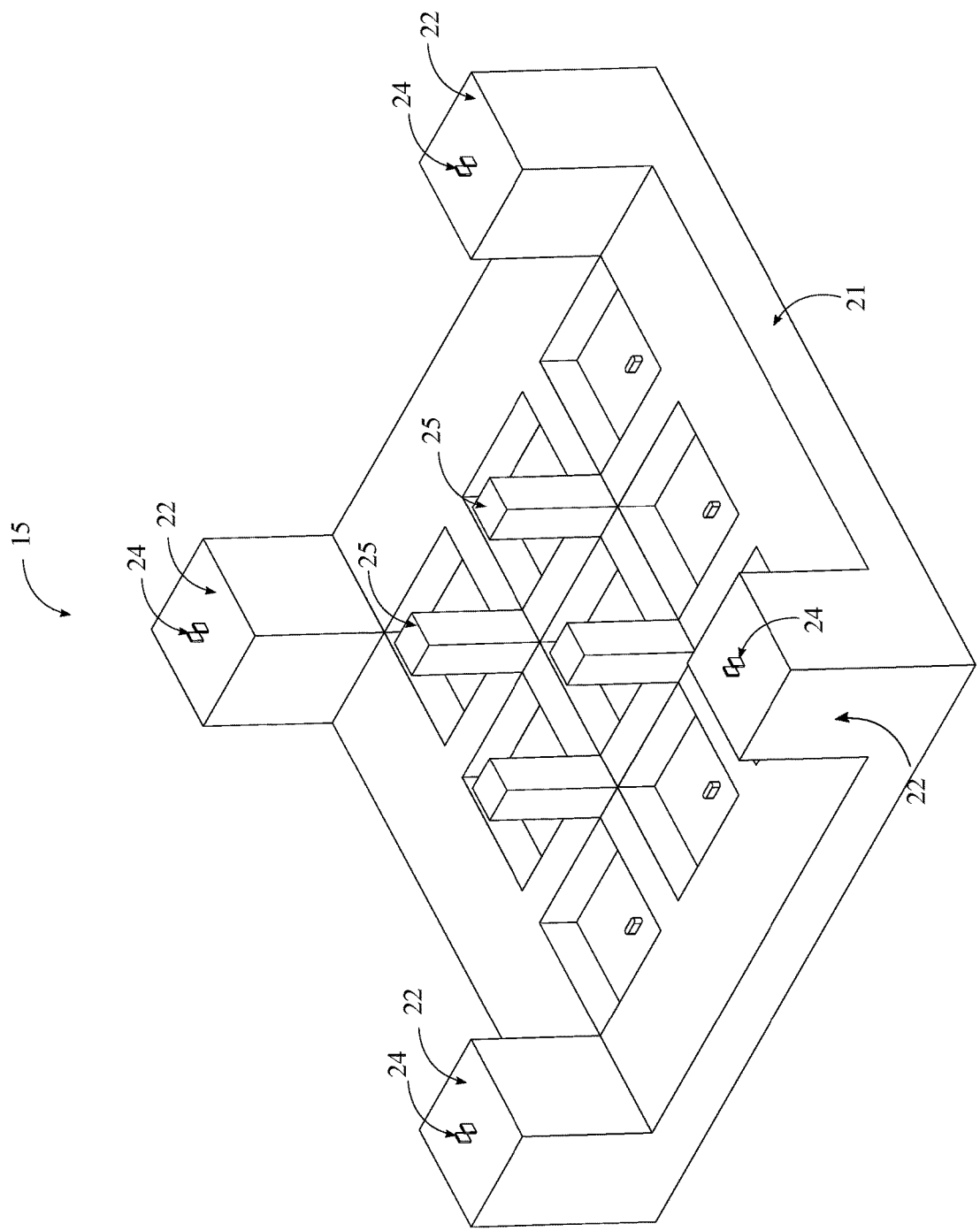
FIG. 8 is a top-front-left perspective view of the dock component of the present invention.
Figure 9:
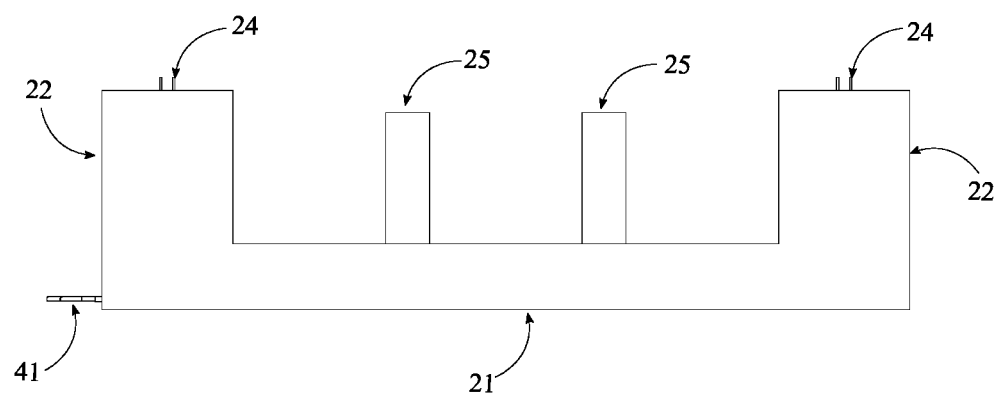
FIG. 9 is a front view of the dock component of the present invention.
Figure 10:
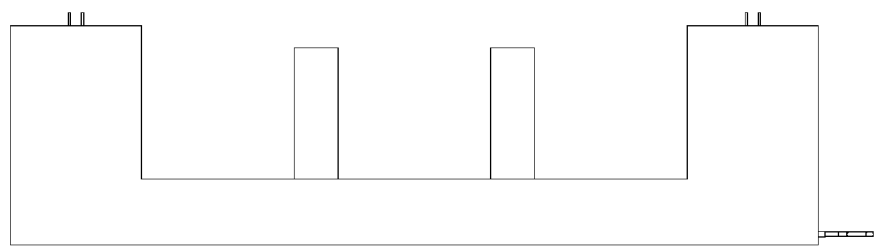
FIG. 10 is a rear view of the dock component of the present invention.
Figure 11:
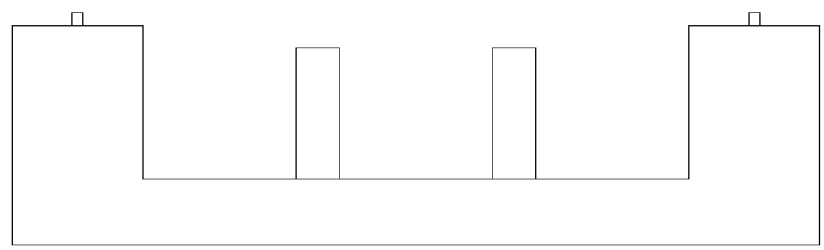
FIG. 11 is a left view of the dock component of the present invention.
Figure 12:
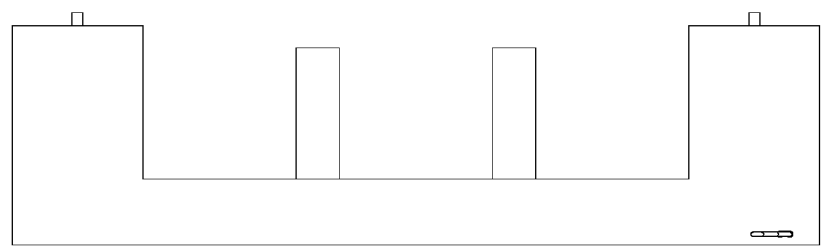
FIG. 12 is a right view of the dock component of the present invention.
Figure 13:
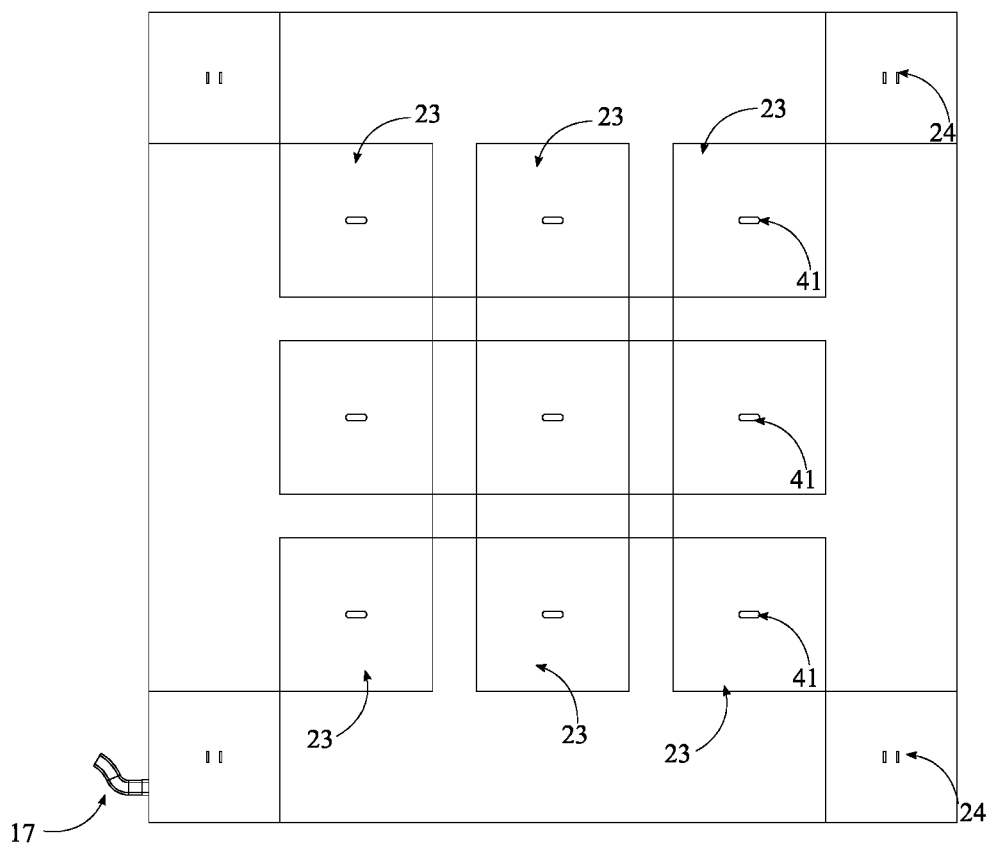
FIG. 13 is a top view of the dock component of the present invention.
Figure 14:
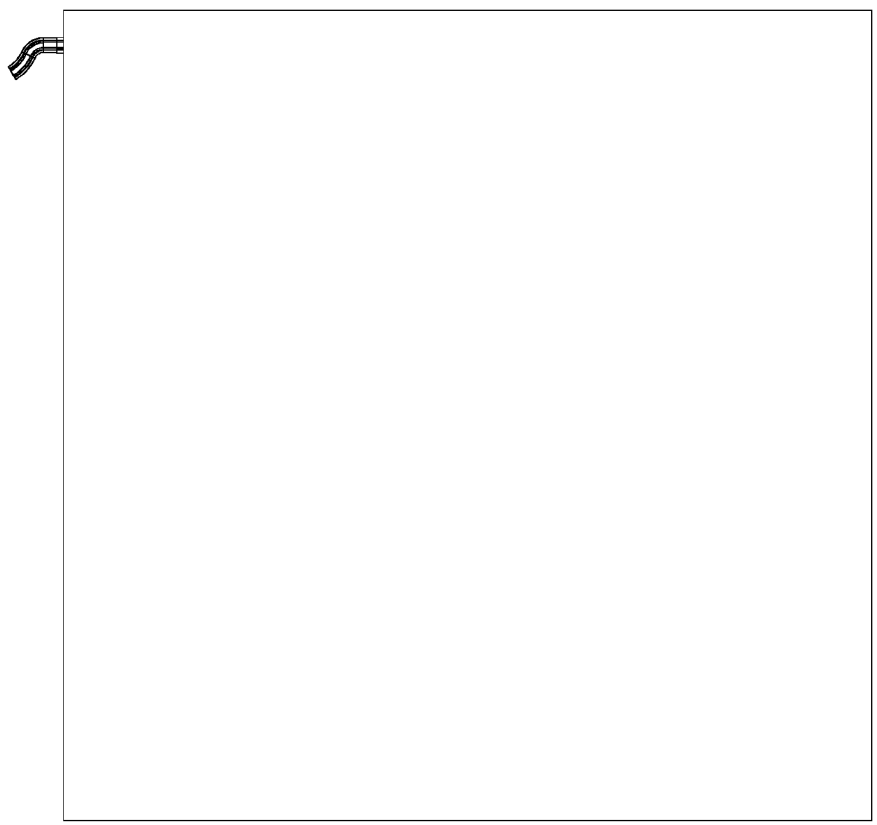
FIG. 14 is a bottom view of the dock component of the present invention.

Yet another component included in the present invention is a charging station. The charging station primarily comprises a dock 15, a layer 16, and a power supply 17. The dock 15 primarily comprises a dock base 21. The dock base 21 is a square shaped plate with a plurality of dock connection towers 22 rising from the corners of the top surface of the base 21. The plurality of dock connection towers 22 comprises a first tower 51, a second tower 52, a third tower 53, and a fourth tower and 54. Each individual dock connection tower 22 is a rectangular prism that extends vertically from one of the four corners of the square shape of the base 21. When viewing the dock 15 from a top view such as in FIG. 13, it can be shown that the plurality of connection towers has a square cross section. The top surface of the plurality of connection towers 22 is flat. Residing on the top surface of the plurality of dock connection towers 22 is a plurality of dock connections 24. The plurality of dock connection towers 22 comprises a plurality of dock connections 24. The plurality of dock connections 24 includes a pair of parallel slot shaped extrusions rising from either side of the center of the top surface of each individual dock connection tower 22. The plurality of dock connections 24 can be seen in FIG. 8. Spaced evenly along the top surface of the base is a plurality of base ports 23. The plurality of base ports 23 comprises ideally nine square shaped indents in the base 21 in an even three-by-three grid. At the center of each base port 23 is a plug 41. The plug 41 is a slot shaped extrusion rising from the surface of the base created by each member of the plurality of ports 23. Attached to the top surface of the base 21 is a plurality of base supports 25. The plurality of base supports 25 comprises a number of rectangular prisms of smaller size than the base connection towers. The plurality of base supports 25 is evenly spaced around the plurality of base ports 23 as shown in FIG. 8 as well. Attached to the right side of the base 21 is a power supply 17. The exact type of power supply may vary, but the power supply 17 connects to the base via an interface in the right side of the base.

Figure 15:
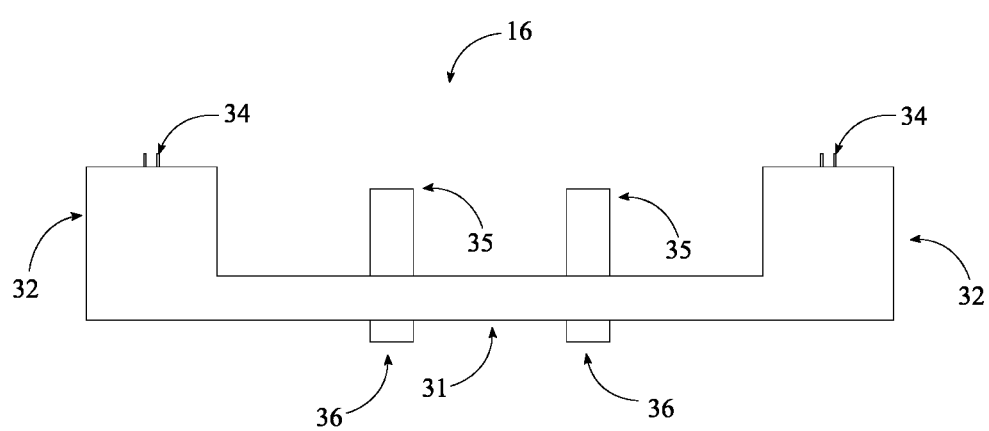
FIG. 15 is a front view of the layer component of the present invention.
Figure 16:
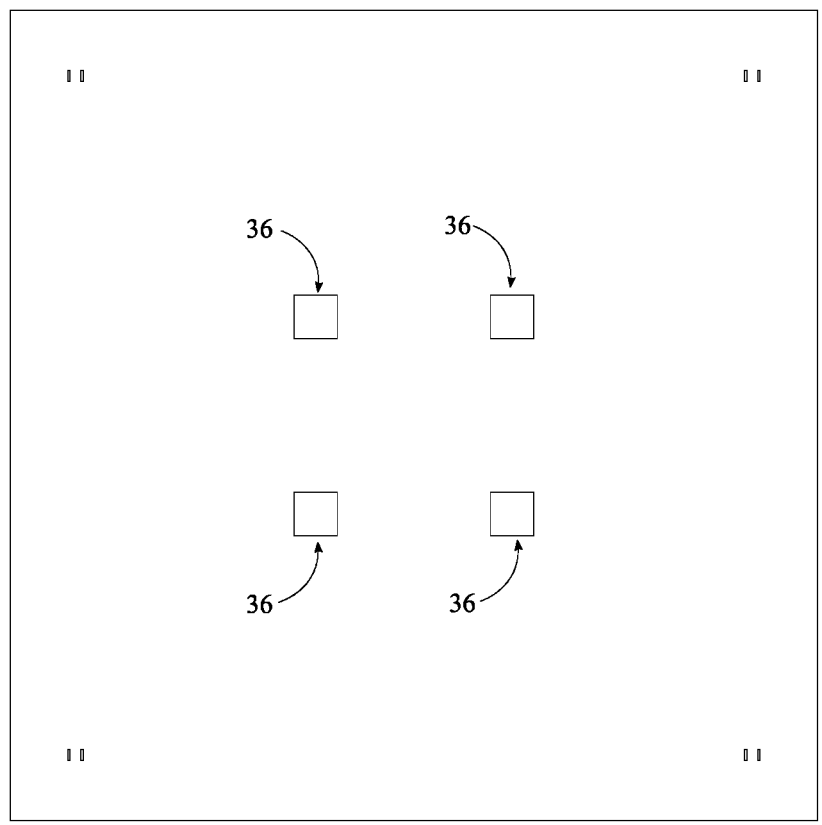
FIG. 16 is a bottom view of the layer component of the present invention.
Figure 17:
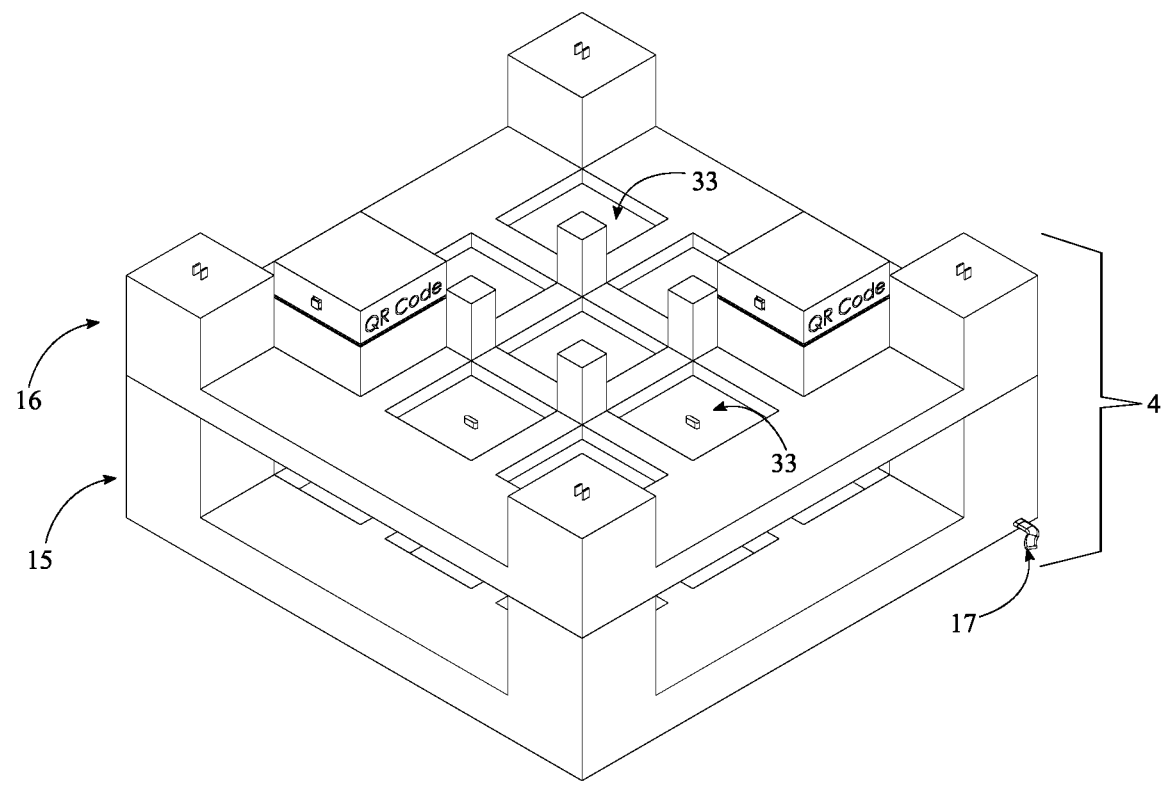
FIG. 17 is a front-top-left perspective view of the partially assembled present invention.

A final component of the Zayne light 1 is the layer 16. The layer 16 is a component similar in shape and size to the base 21. The layer 16 primarily comprises a layer base 31 similar to that of the dock base 21 in shape and size. The layer 16 includes a plurality of layer connection towers 32. The plurality of layer connections towers 32 may vary in size but is relatively identical to the plurality of base connection towers 22. Further, the plurality of layer connection towers 32 includes a plurality of layer connections 34. The plurality of layer connections 34 is arranged with the plurality of layer connection towers 32 in the same fashion the plurality of base connections 24 is arranged with the plurality of base connection towers 22. The layer 16 also includes a plurality of layer supports 35 of close resemblance to the plurality of base supports 25 in shape. Additionally, the layer 16 includes a plurality of layer ports 33 identical to the plurality of base ports 23. As can be seen in FIG. 15 and FIG. 16, the bottom surface of the layer includes a plurality of extrusions 36. The plurality of extrusions 36 comprises a number of small rectangular prisms. The depth and width of each individual extrusion is identical to the depth and width of each individual layer support. Even further, the plurality of extrusions 36 lines up with the plurality of layer supports through the base of the layer.

The Zayne light 1 ideally sits upon each tabletop within a restaurant. As a customer is in need of assistance from a waiter or waitress, the customer can push the switch into the shell to activate the lighting mechanism. This manual activation of the lighting mechanism will illuminate the shell a single solid color. The restaurant staff will be trained to know that this means a customer is in need of assistance. This method of alerting a waiter or waitress is much more efficient in a busy restaurant environment than the traditional strategy of waving a waiter or waitress down. The lighting mechanism can have different modes of operation to indicate different needs of the customer, such as requesting the bill or asking for a refill.

An additional functionality of the Zayne light 1 is a timer. To limit the number of customers placed on a wait list, the Zayne light 1 is capable of keeping track of the amount of time a customer has spent at a table utilizing a timer. The timer preferably interacts with the lighting mechanism to signal the customers or the staff of the amount of time passed. For example, the present invention uses three colors that the lighting mechanism cycles through throughout the customer's experience. Each color can be designated to be emitted after a specific amount of time. As the color of the lighting mechanism changes, the customer is made aware of how much time is left for a standard visit to the restaurant. When the standard amount of time has expired, a fourth color can be activated that signals that the customer should be finalizing the visit to the restaurant. This system will facilitate a steady flow of customers into and out of the restaurant, thus relieving stress on the restaurant staff and keeping customers as satisfied as possible. Further, the QR code being placed on the upper surfaces of the front and back sides of the shell allows customers sitting across from one another at a table to have easy access to the QR code. The exact location of the QR code can be seen in FIG. 4 and FIG. 5. The Zayne light 1 also includes Bluetooth capabilities, allowing the Zayne light cubes 1 to be paired with devices for further control over the functionality of the Zayne light 1.

Although the invention has been explained in relation to its preferred embodiment, it is to be understood that many other possible modifications and variations can be made without departing from the spirit and scope of the invention.

What is claimed is:

1. A light cube comprising:
a shell;
the shell having a front side and a rear side;
the shell having a left side and a right side;
the shell having a top and a bottom;
the shell having an upper surface and a lower surface;
an indent separating the upper and lower surface;
a Quick Response code;
a pair of switches located on the front and rear side of the shell;
each of the pair of switches being recessed into a divot;
the divot being larger in size than each of the pair of switches; and
a lighting mechanism residing in the bottom of the shell.

2. The light cube as claimed in claim 1 comprising:
a charging station;
the charging station comprising a dock, a layer, and a power supply;

the dock comprising a dock base;
the dock base having a top surface and a bottom surface;
the dock base comprising four corners;
the dock base comprising a plurality of dock connection towers;
the plurality of dock connection towers comprising a first tower, a second tower, a third tower, and a fourth tower;
each of the corners of the dock base having one tower positioned at it;
each of the plurality of dock connection towers comprising a dock connection; and
each of the plurality of dock connections being centrally positioned on each of the plurality of dock connection towers.

3. The light cube as claimed in claim 2 comprising:
each of the dock connections include a pair of parallel slot shaped extrusions;
a plurality of base ports spaced on top surface of the dock base;
each of the plurality of base ports being a square shaped indent in the dock base; and
a plug centrally positioned on each of the plurality of base ports.

4. The light cube as claimed in claim 3 comprising:
a plurality of base supports attached to the top surface of the base; and
the plurality of base supports being evenly spaced around the base ports.

5. The light cube as claimed in claim 2 comprising:
the power supply being connected to the base;
the layer comprising a layer base; and
the layer including a plurality of layer connection towers.

6. The light cube as claimed in claim 5 comprising:
the plurality of layer connection towers including a plurality of layer connections;
the layer including a plurality of layer supports;
the layer including a plurality of layer ports; and
the layer including a plurality of extrusions.

7. The light cube comprising:
a shell;
the shell having a front side and a rear side;
the shell having a left side and a right side;
the shell having a top and bottom;
the shell having an upper surface and a lower surface;
an indent separating the upper and lower surface;
a Quick Response code;
a pair of switches located on the front and rear side of the shell; and
a lighting mechanism residing in the bottom of the shell.

8. The light cube as claimed in claim 7 comprising:
each of the pair of switches being recessed into a divot; and
the divot being larger than each of the pair of switches.

9. The light cube as claimed in claim 7 comprising:
a charging station;
the charging station comprising a dock, a layer, and a power supply;
the dock comprising a dock base;
the dock base having a top surface and a bottom surface;
the dock base comprising four corners;
the dock base comprising a plurality of dock connection towers;
the plurality of dock connection towers comprising a first tower, a second tower, a third tower, and a fourth tower;
each of the corners of the dock base having one tower positioned at it; and
each of the plurality of dock connection towers comprise a dock connection.

10. The light cube as claimed in claim 9, comprising:
each of the plurality of dock connections being centrally positioned on each of the plurality of dock connection towers;
each of the dock connection include a pair of parallel slot shaped extrusions;
a plurality of base ports spaced on the top surface of the dock base;
each of the plurality of base ports being a square shaped indent in the dock base;
a plug centrally positioned on each of the plurality of base ports;
a plurality of base supports attached to the top surface of the base; and
the plurality of base supports being evenly spaced around the base ports.

11. The light cube as claimed in claim 9 comprising:
the power supply being connected to the base;
the layer comprising a layer base;
the layer including a plurality of layer connection towers;
the plurality of layer connection towers including a plurality of layer connections.

12. The light cube as claimed in claim 9 comprising:
the layer including a plurality of layer supports;
the layer including a plurality of layer ports; and
the layer including a plurality of extrusions.

13. The light cube comprising:
a shell;
the shell having a front side and a rear side;
the shell having a left side and a right side;
the shell having a top and bottom;
the shell having an upper surface and a lower surface;
an indent separating the upper and lower surface;
a Quick Response code;
a pair of switches located on the front and rear side of the shell;
each of the pair of switches being recessed into a divot;
the divot being larger in size than each of the pair of switches; and
a lighting mechanism residing in the bottom of the shell.

14. The light cube as claimed in claim 13 comprising:
a charging station;
the charging station comprising a dock, a layer, and a power supply;
the dock comprising a dock base;
the dock base having a top surface and a bottom surface;
the dock base comprising four corners;
the dock base comprising a plurality of dock connection towers;
the plurality of dock connection towers comprising a first tower, a second tower, a third tower, and a fourth tower;
each of the corners of the dock base having one tower positioned at it;
each of the plurality of dock connection towers comprising a dock connection;
each of the plurality of dock connections being centrally positioned on each of the plurality of dock connection towers;
each of the dock connection including a pair of parallel slot shaped extrusions;
a plurality of base ports spaced on top surface of the base;
each of the plurality of base ports being a square shaped indent in the dock base; and
a plug centrally positioned on each of the plurality of base ports.

15. The Zayne light cube as claimed in claim 13 comprising:
   a plurality of base supports attached to the top surface of the base;
   the plurality of base supports being evenly spaced around the base ports;
   the power supply being connected to the base;
   the layer comprising a layer base;
   the layer including a plurality of layer connection towers;
   the plurality of layer connection towers including a plurality of layer connections;
   the layer including a plurality of layer supports;
   the layer including a plurality of layer ports; and
   the bottom surface of the layer including a plurality of extrusions.

* * * * *